March 24, 1959     L. G. VOGEL     2,878,776
APPARATUS FOR COATING AND CONVEYING DOUGHNUTS
Filed April 2, 1954     5 Sheets-Sheet 4

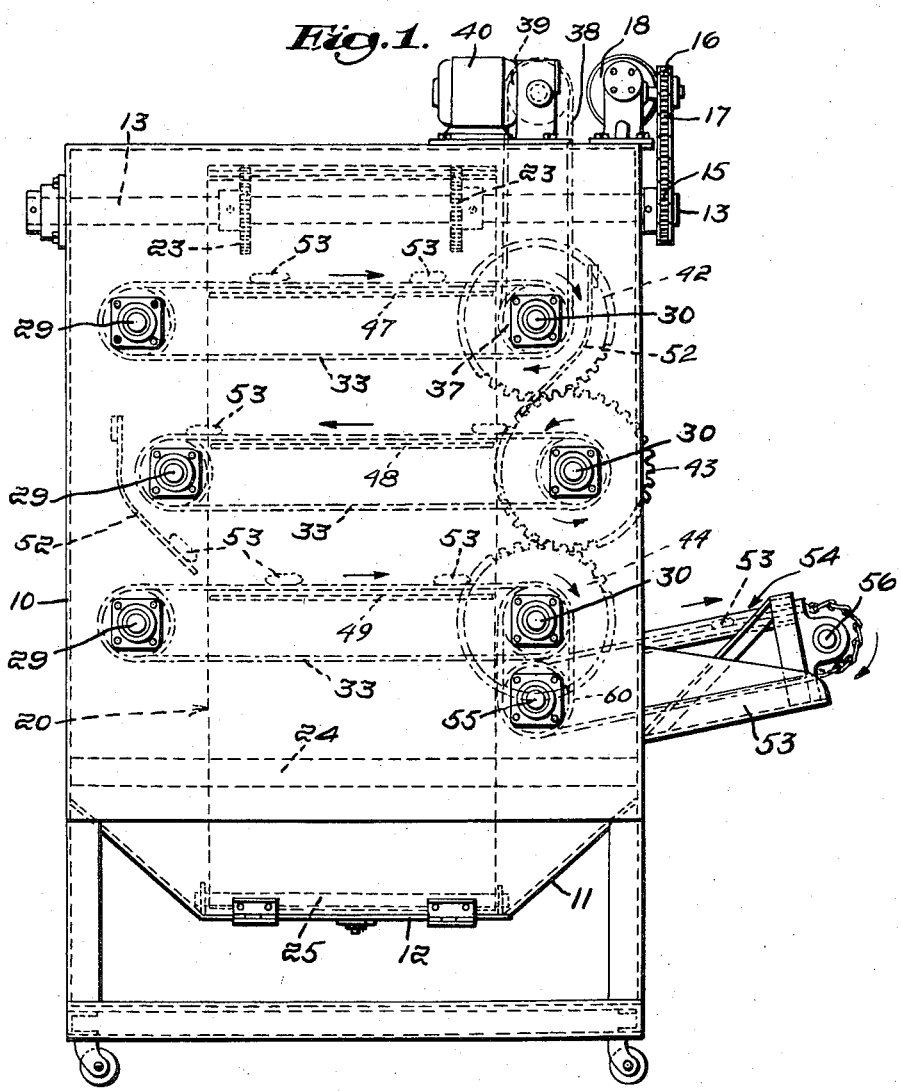

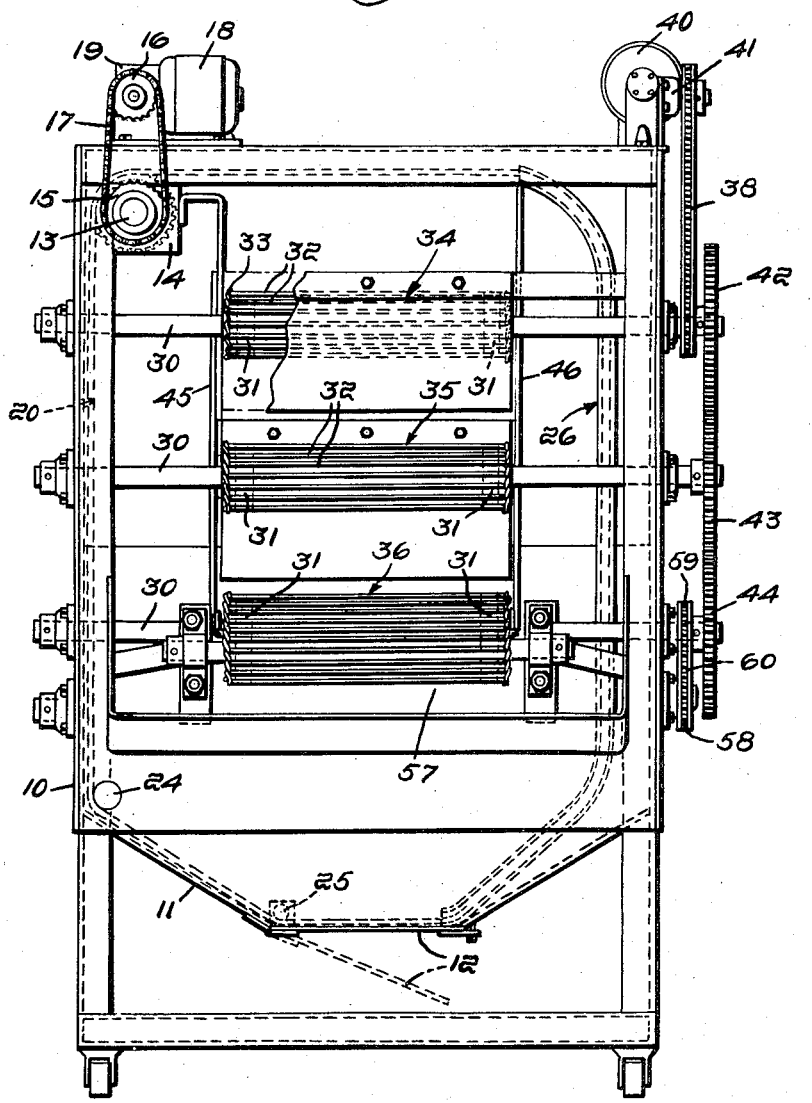

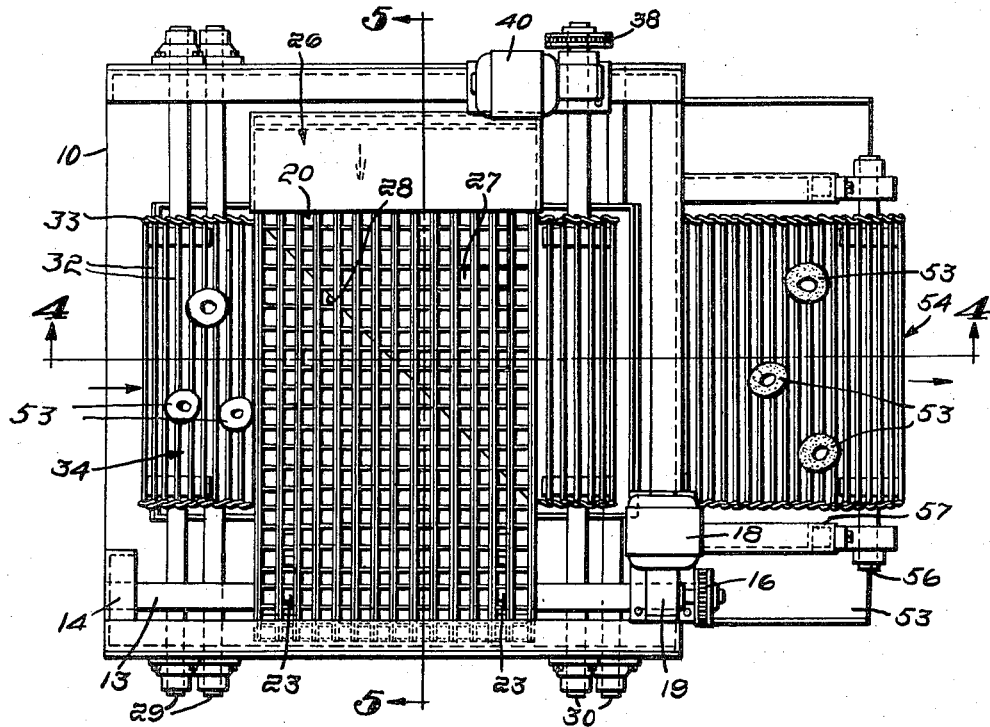
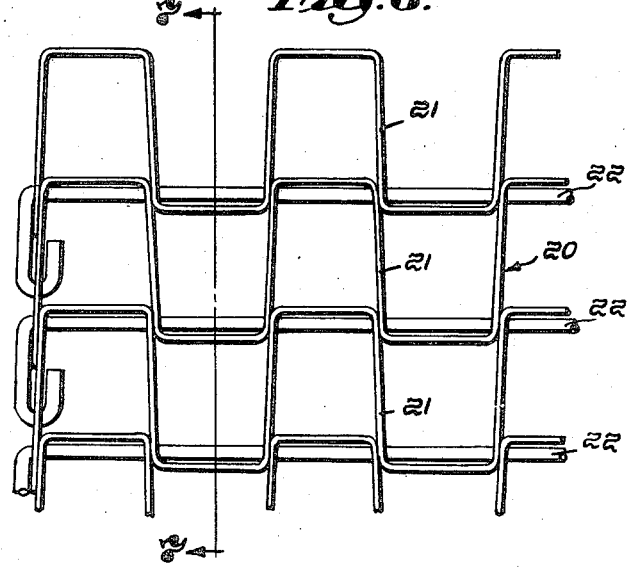
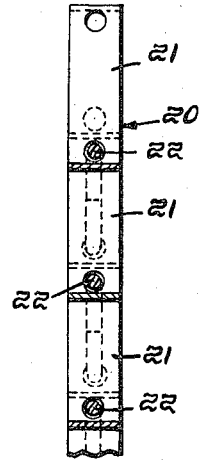

Inventor:
Leo G. Vogel,
by
Attorney

Inventor:
Leo G. Vogel,
by Attorney

United States Patent Office 2,878,776
Patented Mar. 24, 1959

2,878,776

APPARATUS FOR COATING AND CONVEYING DOUGHNUTS

Leo G. Vogel, Portland, Maine

Application April 2, 1954, Serial No. 420,502

4 Claims. (Cl. 118—24)

The present invention relates to conveyor means for elevating flowable materials to and discharging them from an elevated station and to the combination of such means and other conveyors.

While the invention is adapted for a wide range of uses, its general objectives, novel features, and advantages may be most readily appreciated by first considering an embodiment of it for use in treating products with a material, as, for example, coating doughnuts with sugar.

Apparatus for such purposes may have one conveyor for the products or a series of vertically spaced product conveyors. In the latter case, the conveyors alternately travel in opposite directions with a transfer chute located at the end of each vertically spaced pair of conveyors. The material conveyor comprises an endless, reticulated, flexible member usually encircling all of the product conveyors in an interersecting direction with its lower course extending through a well or sump for the flowable material, sugar, for example.

The supporting structure for the section of the endless member that is vertically ascending has inner and outer walls that are spaced to receive the member between them and to hold therein material enmeshed and carried upwardly thereby. The inner wall extends upwardly and terminates in a ledge underlying a portion of the upper course of the member and preferably having its edge extending diagonally with respect both to the path of the member and to the path of the subjacent conveyor. In practice, the inner wall serves as a supporting guide for the member between its upper and lower courses and the outer wall is of approximately the same extent and, in any event, extends downwardly and into the sump.

With such apparatus, the material conveyor continuously raises the flowable material to an elevated station for discharge downwardly to and transversely of the path of the products, with the excess material flowing back to the sump.

With the foregoing in mind, it will be understood that the term "flowable material," as used herein, means not only such solids of small particle size as sugar, but also any material that will flow or slide under the influence of gravity and that the pockets of the conveyor member are dimensioned to receive. It will also handle semi-solids and liquids provided that the slippage or reverse flow, due to the relatively large clearances be-between the member and said walls, is not objectionably large.

It will also be appreciated that the conveyor or conveyors onto which the flowable material is discharged may carry a wide range of products and materials depending on the particular conveyor structure employed.

In the accompanying drawings, there is shown an illustrative embodiment of the invention from which these and other of its objectives, novel features, and advantages will be readily apparent.

In the drawings:

Fig. 1 is a side view of apparatus in accordance with the invention.

Fig. 2 is a view of the apparatus as seen from its outfeed end.

Fig. 3 is a top plan view of the apparatus.

Figure 4:
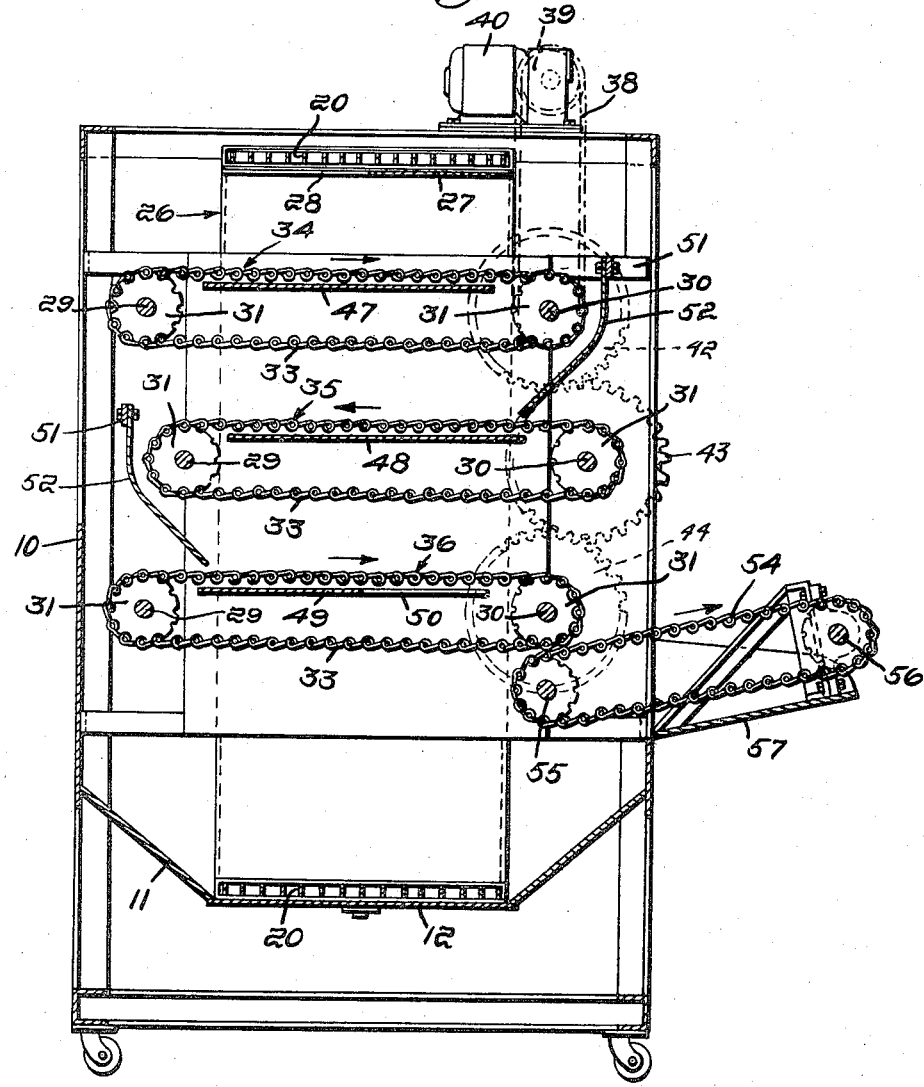
Figure 5:
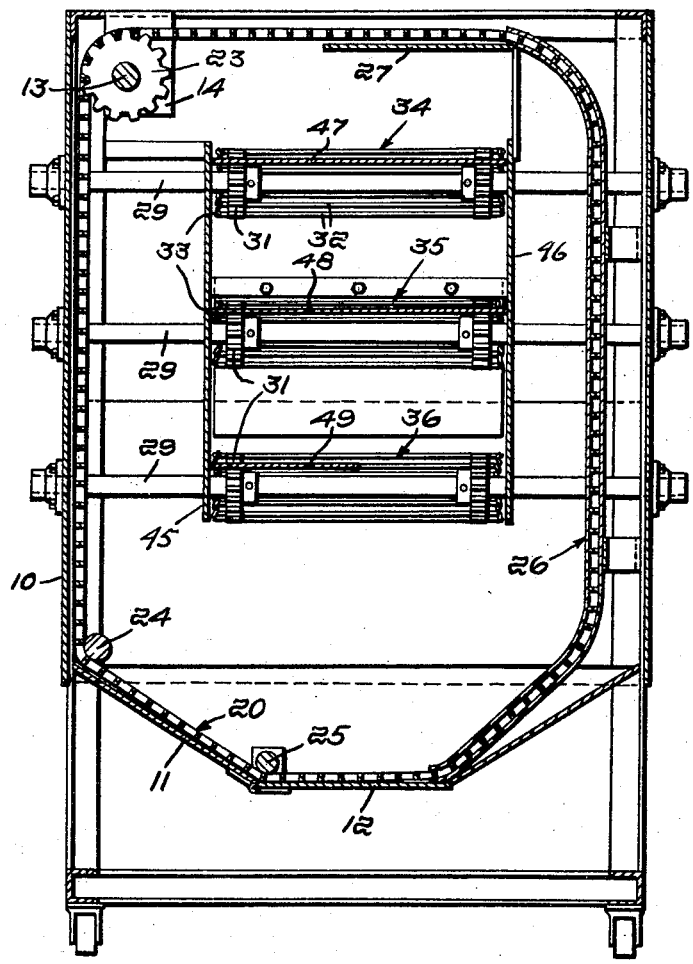

Figs. 4 and 5 are sections taken along the indicated lines 4—4 and 5—5, respectively, of Fig. 3.

Fig. 6 is an enlarged fragmentary plan view of the material conveyor, and

Fig. 7 is a section taken along the indicated lines 7—7 of Fig. 6.

In the drawings, apparatus for use in sugar coating doughnuts is shown to illustrate the invention. Such apparatus is shown as having an open-ended housing 10 whose floor is downwardly inclined relative to its sides and ends to define a sump 11, the bottom of which is shown as a clean-out door 12.

Adjacent the upper edge of one side of the housing 10, there is a shaft 13 whose journals are indicated at 14. Fast on one end of the shaft 13 is a sprocket 15 (see Fig. 2) connected to the sprocket 16 by the chain 17. The sprocket 16 is driven by the motor 18 through the gear box 19.

The material conveyor comprises an endless flexible open-mesh member generally indicated at 20. While the member 20 may be otherwise constructed, that detailed in Figs. 6 and 7 is commercially available and has proved satisfactory in use. The member 20 is shown as consisting of transverse strips 21 of flat stock formed into a plurality of U-shaped bends alternately opening in opposite directions. The bends of each strip 21 are partially entered into corresponding bends of other strips and connected thereto by transverse pivots 22. There is thus provided an open-mesh member whose pockets are of appreciable depth. Either edge of the pockets can function as a scraper relative to a surface over which it is dragged.

The member 20 is trained over sprockets 23 on the shaft 13 and extends downwardly around the guide 24 and into the sump 11 where it extends under the guide 25. Secured to the opposite side of the housing 10 is supporting structure for the ascending flight of the member 20 whose function it is to render the member 20 effective to elevate sugar from the sump 11 to the upper part of the housing 10 and there discharge it. While the supporting structure may be variously made, it is shown as comprising a casing 26 defining a passageway whose cross sectional size and shape is approximately that of the member 20 and whose upper and lower portions are disposed to afford suitable guides for the member 20 between its upper delivery course and its lower sump entering course.

In the apparatus shown in the drawings, the sugar entrant of the pockets of the member 20 as it passes through the sump 11 is trapped therein by the inner and outer walls of the casing 26 until the upper course is reached. Discharge of the sugar is prevented by the inner casing wall and by means of a ledge 27 which may conveniently be a part of the inner casing wall and which underlies a part of the upper course of the conveyor 20. The ledge 27, for reasons that will subsequently be apparent, is of a width at least equal to that of the member 20 and has its edge 28 disposed diagonally of its direction of travel.

Journaled in the side walls of the housing 10 are pairs of shafts 29 and 30. Each shaft has a pair of sprockets 31 to receive the cross members 32 whose ends are interconnected as by chains 33. Each such conveyor is approximately identical and, for convenience, the uppermost conveyor will be hereinafter generally referred to as the conveyor 34, the next lower conveyor as the conveyor 35, and the lowermost conveyor as the conveyor 36.

The shaft 30 of the conveyor 34 has a sprocket 37 connected by the chain 38 to the sprocket 39 driven as by the motor 40 through the gear box 41 and, in this connection, reference is made to Figs. 1, 2, and 4. The shaft 30 of the conveyor 34 also has a gear 42 which meshes with the gear 43 on the shaft 30 of the conveyor 35 and said gear 43 meshes with the gear 44 fast on the shaft 30 of the conveyor 36. As a consequence, the conveyors 34, 35, and 36 travel in the direction indicated by the arrows in Figs. 1 and 4 with the upper courses of the conveyors 34 and 36 traveling from the infeed end of the housing 10 towards the outfeed end thereof while the corresponding course of the conveyor 35 travels in the opposite direction.

The conveyors 34, 35, and 36 are located between inner walls 45 and 46. Those inner walls are shown as supporting plates 47, 48, and 49 located under the upper course of the conveyors 34, 35, and 36, respectively. The plates 47 and 48 serve to hold the material in position to be carried along to the ends of their conveyors while the plate 49 terminates in a diagonally disposed edge 50 above the sump 11 thus to distribute material carried along it by the conveyor 36 transversely of the conveyor member 20.

The walls 45 and 46 also have brackets 51 which serve to detachably support guide plates or chutes 52, one between the conveyors 34 and 35 at the discharge end of the conveyor 34 and another between the conveyors 35 and 36 at the discharge end of the conveyor 35. As will be apparent from Fig. 1, the guide plates 52 are disposed to receive a doughnut 53 as it topples from the upper conveyor and to transfer it in an inverted position to the next lower conveyor. The guide plates 52 also function to transfer material from one conveyor to another.

By this construction, doughnuts 53 are passed back and forth and downwardly through the housing 10 thus to be thoroughly coated with sugar before they are discharged onto a conveyor 54 whose shaft 55 is journaled in the side walls of the housing 10 and whose shaft 56 is suitably supported by the outer end of an upwardly inclined way 57. The conveyor shaft 55 has a sprocket 58 connected to the sprocket 59 on the shaft 30 of the conveyor 36 by a chain 60. Its direction of travel is the same as that of the conveyor 36.

Should doughnuts be wanted that are not to be sugared, the material conveyor is not operated and the apparatus can be used with the doughnuts being passed back and forth by the conveyors 34, 35, and 36. If preferred, the slide plate 52 between the conveyors 34 and 35 may be removed and replaced by a chute, thus enabling the conveyors 35 and 36 to be bypassed and also eliminating the necessity for a bypass conveyor around the sugaring apparatus.

It will thus be seen that the invention makes possible means for economically and efficiently sugaring doughnuts and eliminates the breaking and damage previously experienced.

What I therefore claim and desire to secure by Letters Patent is:

1. Apparatus comprising a plurality of vertically spaced endless conveyors alternating in their direction of travel, each conveyor being reticulated, a supporting plate below the upper course of each of said conveyors, a transfer chute at the end of each vertically spaced pair of conveyors, and a conveyor encircling said vertically spaced conveyors in an intersecting direction, said encircling conveyor having an exposed receiving portion below the lowermost reticulated conveyor and discharge means for said encircling conveyor above the uppermost of said vertically spaced conveyors.

2. In apparatus for conveying products and treating them with flowable materials, a plurality of vertically spaced endless product conveyors alternating in their direction of travel, each conveyor being reticulated, a supporting plate below the upper course of each product conveyor, a product transfer chute at the end of each vertically spaced pair of conveyors, and a material conveyor comprising an open mesh, flexible, endless member encircling said product conveyors in an intersecting direction, and means defining a conduit for the section of said member that ascends and including an infeed portion below the lowermost product conveyor and an outfeed ledge above the uppermost conveyor whose discharge edge is angularly disposed with respect to the path of said member and the path of said uppermost conveyor.

3. In apparatus for conveying products and treating them with flowable materials, a plurality of vertically spaced endless product conveyors of the open-work type alternating in their direction of travel, each conveyor being reticulated, a supporting plate below the upper course of each product conveyor, a product transfer chute at the end of each vertically spaced pair of conveyors, a sump for the material below the lowermost product conveyor and a material conveyor comprising a reticulated flexible endless member encircling said product conveyors in an intersecting direction, and means confining that section of said member that ascends and enmeshed materials carried thereby and defining a conduit for the materials inclusive of said sump, and an outfeed ledge above the uppermost product conveyor whose discharge edge is angularly disposed with respect to the path of said member and the path of said uppermost conveyor.

4. In apparatus for treating products with flowable materials, a sump for the material, a flexible, open mesh endless member disposed with its lower course extending through said sump, supporting structure for the ascending section of said member comprising an inner wall about which said member is trained and which includes at its upper end a ledge diagonally underlying a part of the upper course of the conveyor and an outer wall spaced from said inner wall and extending into said sump, the mesh establishing parts of the member being engageable with said walls and so dimensioned in relation to the wall spacing that said walls retain enmeshed particles during their upward travel, an endless product conveyor of the open-work type located between the courses of the member and having its path intersected by that of said member, there being a supporting ledge below the upper course of said product conveyor, the edge of said product ledge extending diagonally with respect to the member and to said conveyor.

References Cited in the file of this patent

UNITED STATES PATENTS

| | | |
|---|---|---|
| 1,083,685 | Kellogg | Jan. 6, 1914 |
| 1,432,701 | Lawrence | Oct. 17, 1922 |
| 1,824,796 | Sisco | Sept. 29, 1931 |
| 2,248,643 | Rasmusson | July 8, 1941 |
| 2,347,164 | Petrilli | Apr. 18, 1944 |